United States Patent [19]

Pratt et al.

[11] 4,062,046
[45] Dec. 6, 1977

[54] LASER MACHINING

[76] Inventors: Norman Leslie Pratt, 67 Sunningdale Drive, Daventry, Northants; Michael Bowen Davies, 2 Palmers Close, Hillmorton, Rugby, both of England

[21] Appl. No.: 739,279

[22] Filed: Nov. 5, 1976

[30] Foreign Application Priority Data

Nov. 21, 1975 United Kingdom ............ 48060/75

[51] Int. Cl.² .............................................. H04N 7/18
[52] U.S. Cl. .................................... 358/93; 358/101
[58] Field of Search ............... 358/93, 101, 108, 148, 358/199

[56] References Cited

PUBLICATIONS

Western Electric Technical Digest No. 20, Oct. 1970, pp. 19-20.

*Primary Examiner*—John C. Martin
*Assistant Examiner*—Aristotelis M. Psitos
*Attorney, Agent, or Firm*—Dennison, Dennison, Meserole & Pollack

[57] ABSTRACT

The invention provides a closed television system for viewing the pulsed laser beam machining of a workpiece said system including a TV camera tube which, in use, is pointed at the area of incidence of the laser beam on said workpiece, a rotary shutter in the optical path of said TV camera tube for intercepting intermittently the light passing along said optical path, and means for synchronising the pulsing of the laser and the rotation of said shutter so that, in use, said shutter prevents light from reaching said TV camera tube each time said laser is pulsed. The invention can be applied to conventional closed circuit television systems to produce a system for viewing the machining a workpiece with a pulsed laser beam without the bright light produced during such a machining operation permanently overloading the TV camera tube.

5 Claims, 3 Drawing Figures

LASER MACHINING

This invention relates to laser machining. In machining operations which use a pulsed laser beam to remove material from a workpiece a bright plume of vaporised material usually occurs during the machining operation. If one attempts to view such machining operations using a closed circuit television system (CCTV), this bright plume produces an overload on the camera tube of the CCTV system which results in the associated TV picture tube becoming blank. The time for recovery from this overload is usually of the order of one second so that use of a laser beam pulsed at a repetition frequency greater than one pulse per second causes the TV camera tube to be permanently overloaded and the TV picture tube to be permanently blank. For many machining operations a laser beam having a pulse repetition rate greater than one pulse per second is needed. For the above reason, it is not possible to use a conventional closed circuit television system to monitor such maching operations.

A way has now been found of overcoming this problem. Accordingly, the present invention provides a closed circuit television system for viewing the pulsed laser maching of a workpiece, the system including a TV camera tube which, in use, is pointed at the area of incidence of the laser beam on the workpiece, a rotary shutter in the optical path of the TV camera tube for intercepting intermittently the light passing along the path, and means for synchronising the pulsing of the laser and the rotation of the shutter so that, in use, the shutter prevents light from reaching the TV camera tube each time the laser is pulsed.

One embodiment of the invention will now be described, by way of example, with reference to the accompanying drawings, in which.

The drawings illustrate an embodiment of the invention in which the synchronisation of the pulses of the laser 4 and the rotary shutter 3 is achieved by means of a photodiode 1 and an associated light source 2 positioned on opposite sides of the rotary shutter 3.

Figure 1:
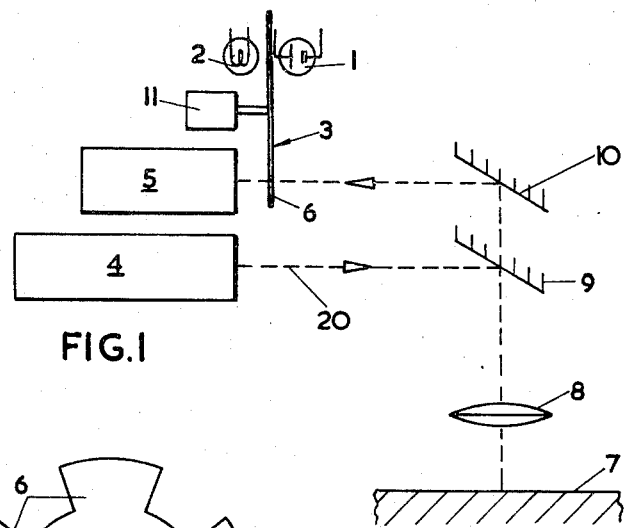
FIG. 1 is a diagram of a closed circuit television viewing system of the invention.

Referring to FIG. 1, a workpiece 7 is machined using a pulsed laser beam 20 generated by a laser 4 and reflected onto the workpiece by a dielectric (i.e. half-silvered) mirror 9. The beam is focused onto the workpiece by objective lens 8.

The machining of the workpiece 7 is viewed by a TV camera tube 5, the light emanating from the surface of the workpiece 7 passing through objective lens 8 and dielectric mirror 9 and being reflected at a mirror 10 before passing along the optical path of the TV camera tube 5.

Figure 2:
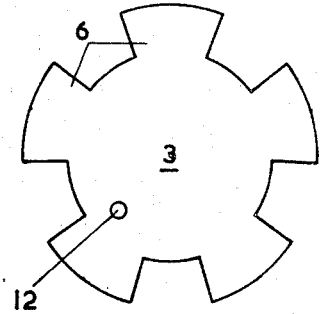
FIG 2 is a diagram of the shape of the rotary shutter used in the viewing system of FIG. 1.

As shown in FIG. 2, the rotary shutter 3 used in this embodiment of the invention is an opaque circular disc having projections 6 which are sectors having a larger radius than that of the disc. It is desirable to use a number of projections 6 on the rotary shutter 3, usually at least five, sufficient to increase the flicker frequency to a value greater than the persistence of vision of the TV camera tube. The shutter 3 is positioned so that when it rotates the projections 6 intercept the optical path of the TV camera tube. The shutter 3 is driven by means of a synchronous AC motor 11 locked to the mains frequency thus allowing the occultation frequency of the shutter to be accurately known.

Figure 3:
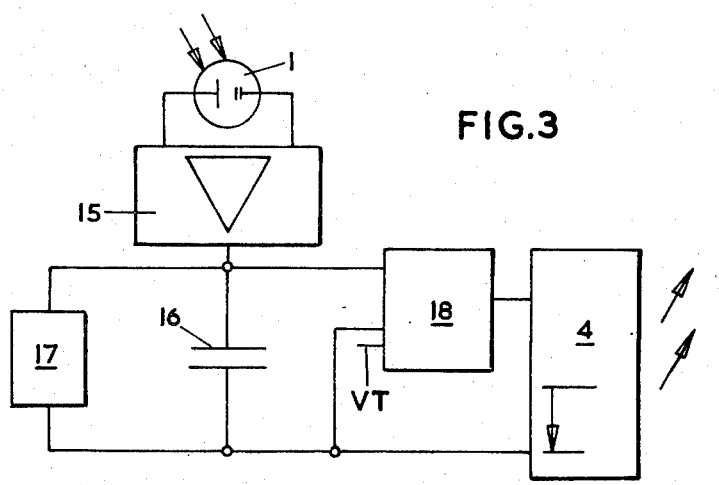
FIG. 3 is a circuit diagram illustrating the circuit used to synchronise the rotary shutter and the laser pulses in the viewing system of FIG. 1.

The pulsing of the laser and the rotation of the shutter 3 are synchronised by means of a hole 12 on the shutter through which light from a lamp 2 can pass to activate a photodiode 1. The photodiode 1 is connected to the laser 4 by means of the circuit shown in FIG. 3. Each time that the hole 12 in the shutter 3 is in line with the photodiode 1, light shines on the diode and causes a charge to flow. The charge is amplified by an amplifier 15 and flows to a capacitor 16 to increase its potential. When the potential on the capacitor 16 reaches a predetermined trigger voltage VT, as determined by comparator 18, the laser is pulsed by discharge of the capacitor 16 and the circuit is switched to start the sequence over again by reset device 17.

There is a delay of the order of 40 milliseconds from the time that the photodiode 1 is illuminated by the lamp 2 and the firing of the laser 4. This time delay must be taken into account when positioning the hole 12, and generally results in the position of the hole being such that the photodiode is illuminated by the lamp before a projection 6 of the rotary shutter 3 intercepts the optical path of the TV camera 5.

It will be evident that with the arrangement described, the laser can be made to pulse at a maximum rate of once per revolution of the shutter. By varying the intensity of the light source 2, and thus the quantum of charge flowing from amplifier 15 to the capacitor 16, a large range of pulse repetition frequencies below the fundamental rotational frequency of the shutter can be obtained.

What is claimed is:

1. A closed circuit television system for viewing the pulsed laser beam machining of a workpiece said system including a TV camera tube which, in use, is pointed at the area of incidence of the laser beam on said workpiece, a rotary shutter in the optical path of said TV camera tube for intercepting intermittenly the light passing along said optical path, and means for synchronising the pulsing of the laser and the rotation of said shutter so that, in use, said shutter prevents light from reaching said TV camera tube each time said laser is pulsed.

2. A closed circuit television system as in claim 1, wherein the synchronisation of the pulsing of said laser and rotation of said shutter is achieved by means of a light source and a photodiode positioned on opposite sides of the rotary shutter, the shutter having an aperture through which light from said light source can pass to said photodiode and said photodiode being connected to said laser in a manner such that the laser is pulsed only when a pre-selected quantum of light has fallen on said photodiode.

3. A closed circuit television system as in claim 1, wherein said rotary shutter is an opaque disc having a number of projections which are sectors having a radius larger than that of the disc.

4. A closed circuit television sysytem as in claim 3, wherein said rotary shutter has at least five said projections.

5. A closed circuit television system as in claim 1 wherein said rotary shutter is driven by a synchronous AC motor locked to the mains frequency.

* * * * *